United States Patent Office 2,779,776
Patented Jan. 29, 1957

2,779,776

METHOD OF PREPARING SILOXANE FLUIDS

James Franklin Hyde and Gust J. Kookootsedes, Midland, Mich., assignors to Dow Corning Corporation, Midland, Mich., a corporation of Michigan No Drawing. Application April 29, 1954,
Serial No. 426,560

8 Claims. (Cl. 260—448.2)

This invention relates to a method of preparing in a novel manner polysiloxanes having reactive end groups on the molecules.

Prior to this invention it was known that siloxanes could be polymerized with aqueous acids. It was also known that halo and alkoxy silanes could be hydrolyzed in the presence of acid catalysts to give polysiloxanes. In general the procedure employed in these past methods consisted of refluxing or heating the siloxane or the silane in the presence of the acid. Under these conditions no attempt was made to control the concentration of the acid. For example, when hydrochloric acid was employed the mixture was merely refluxed and was not confined in a closed container. Thus, HCl was obviously lost by diffusion from the system. Another variation of this previously known method was to carry out the hydrolysis and polymerization of the siloxane or silane in the presence of large amounts of solvents. This method results in the formation of a large proportion of cyclic siloxanes and is not designed to give the products which are prepared by the method of this invention. Another previously known method for employing acids to rearrange siloxanes was that of using anhydrous acids. Whereas this method is excellent for depolymerizing high molecular weight siloxanes it does not lend itself to control of the molecular size nor is it a good method for increasing the molecular size of low molecular weight siloxanes such as, for example, the cyclic tetramer of organosiloxanes.

The essence of the present invention lies in the discovery that the reaction between a siloxane and an aqueous acid is reversible and that the polymer size of the siloxane at the point of equilibrium of the reversible reactions is determined by the concentration of the acid in the aqueous phase. This discovery provides a new means for commercially feasible production of a whole range of compounds which have been previously prepared with difficulty or not at all. These compounds comprise organopolysiloxanes which have acidic groups on the end of the chains and organosiloxanes which have hydroxyl groups on the end of the chains.

The terms "acidic groups" or "acid end groups" as employed herein refers to acid anions attached to silicon atoms (i. e., halogen atoms, nitrate groups and trifluoroacetoxy groups). The term "acidic silane" refers to silanes having acidic groups attached to the silicon atom (i. e., dimethyldichlorosilane, etc.).

It is the object of this invention to provide an economically feasible method for preparing polysiloxanes with reactive end groups. Another object is to prepare polysiloxane fluids which are uniquely useful in the treatment of textiles, in adhesives and in the preparation of antifoaming compositions for aqueous systems. Other objects and advantages will be apparent from the following description.

In accordance with this invention an organosilicon compound having the unit formula $$R_n SiO_{\frac{4-n}{2}}$$

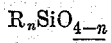

where R is a monovalent hydrocarbon radical or a halogenated monovalent hydrocarbon radical and $n$ has an average value from 1.98 to 2 is maintained in contact with a separate aqueous phase comprising an aqueous solution of a monobasic acid having a dissociation constant of at least .01 at 25° C. in a closed system at a temperature below that at which the organic groups are cleaved from the silicon until the organosilicon compound reaches a substantially constant viscosity. In this reaction the aqueous phase is present in amount of at least 10% by volume of the organosilicon compound.

When the above conditions are adhered to the organosilicon compound will react with the acid and at the same time the acid groups on the silicon will be hydrolyzed by the water. These competing reactions produce a viscosity change in the siloxane. The reaction is allowed to continue until a constant viscosity is obtained at which point the system is in equilibrium. The aqueous acid phase is then separated from the siloxane phase. The resulting product is a polysiloxane having acid groups on the end of the molecules.

The average molecular size of the siloxane at the point of equilibrium will depend upon the concentration of acid in the aqueous phase. The higher the concentration of acid the lower will be the average molecular size of the siloxane and hence the lower will be the viscosity. The lower the concentration of the acid in the aqueous phase the greater will be the average molecular size of the resulting siloxane at equilibrium and hence the higher will be the viscosity of the product.

Thus if one places an organosiloxane, say for example a cyclic tetrasiloxane, in contact with an aqueous acid of a given concentration, and allows the system to come to equilibrium, a certain viscosity fluid will be obtained. The precise viscosity at equilibrium will vary from acid to acid and from siloxane to siloxane. For example, with say 35% HCl and dimethylsiloxane, a certain viscosity fluid will be obtained at equilibrium. With 35% HCl and ethylmethylsiloxane, a different viscosity fluid will be obtained at equilibrium. Likewise the viscosity of the fluids obtainable with a given siloxane will vary from acid to acid. Thus the viscosity of a fluid obtained employing dimethylsiloxane with 35% HCl will be different from the viscosity of the fluid obtained employing dimethylsiloxane and 35% nitric acid. However, for any given siloxane and any given acid, the viscosity of the final product at equilibrium is dependent solely upon the concentration of the acid in the aqueous phase.

The reaction of this invention can be carried out at any given temperature or any pressure. Obviously the reaction should be at a temperature below that at which hydrocarbon groups are cleaved from the silicon. In general the best reaction temperatures range from 20 to 100° C. Since the concentration of the acid in the aqueous phase will change with temperature, it is desirable to hold the temperature essentially constant during a reaction. However, this is not critical since if the temperature becomes too high and a lower viscosity fluid is obtained than is desired, the desired viscosity can be obtained by merely lowering the temperature and allowing the system to again come to equilibrium. As is well known, the concentration of the acid in the aqueous phase will decrease with increasing temperature. Thus for any given original concentration of acid the viscosity of the resulting product will be lower the higher the temperature of the reaction.

As stated above pressure is not critical in the process of this invention. One may employ pressures ranging from subatmospheric to superatmospheric. In some cases it may be desirable to employ superatmospheric pressure particularly when dealing with volatile acids. For example, when it is desired to prepare a low viscosity fluid from dimethylsiloxane, say of the order of 50 cs., by employing HCl in the aqueous phase, it is necessary to employ pressure in order to build up a sufficient concentration of the acid to give the desired product. Conversely by lowering the pressure of this system it is possible to decrease the concentration of the acid to very low values and hence obtain products of very high viscosity, i. e., 10,000,000 cs. or above.

The reaction rates involved in this invention will vary with temperature, pressure and acid concentration. In general the higher the concentration, temperature and pressure, the faster an equilibrium will be obtained. In commercial operations fluids of the order of 100 to 1,000,000 cs. can be prepared from siloxanes having from 1 to 5 cs. viscosity in a matter of 1 day or less.

After the siloxane has reached equilibrium, the acid layer is then removed by any suitable means and the resulting product is a polysiloxane having acid end groups corresponding to the anion of the acid employed. For example, HCl gives chlorine end-blocked polymers whereas trifluoro acetic acid will give trifluoro acetoxy end-blocked polymers.

The corresponding hydroxyl end-blocked polymers are readily prepared by merely hydrolyzing the acid groups from the silicon by washing the polymers with water until the system is neutral. The viscosity of the hydroxyl ended polymer is essentially the same as that of the acid ended polymer. Thus by the process of this invention hydroxyl ended polymers of any desired viscosity can be readily prepared. This method gives a particularly advantageous way of preparing hydroxylated siloxane fluids in the viscosity range of from 100 to 1,000,000 cs.

Polysiloxanes which are employed in this invention are those which have an average from 1.98 to 2 monovalent hydrocarbon radicals per silicon atom. For the purpose of this invention any monovalent hydrocarbon and/or halogenated monovalent hydrocarbon radical can be substituted on the silicon. Thus, for example, this invention includes within its scope siloxanes in which the R groups are alkyl such as methyl, ethyl and octadecyl; alkenyl groups such as vinyl, allyl and hexenyl; cyclo aliphatic groups such as cyclohexyl, cyclohexenyl and cyclopentyl; aryl groups such as phenyl, tolyl, naphthyl and xenyl; and aralkyl groups such as benzyl and halogenated monovalent hydrocarbon radicals such as chlorophenyl, bromoxenyl, pentafluoroethyl, chlorotrifluorocyclobutyl and trifluorotolyl. It should be understood that the siloxane can be homopolymeric or copolymeric. It should also be understood that the organo radicals attached to each silicon atom can be the same or different.

For the purpose of this invention there should be no more than 2 mol percent monoorganosiloxane in the reaction mixture. When monoorganosiloxanes are present, care should be taken that molecular aggregation of the product does not reach a point where gelation occurs. However, if this does take place, the gel can be reconverted to a fluid by increasing the concentration of the acid in the aqueous phase.

The starting siloxane in the method of this invention can have a molecular aggregation either above or below that of the desired product. Thus, for example, one may start with low molecular weight cyclic siloxanes and increase the viscosity to the desired point or one may start with high molecular weight nonflowing siloxanes and decrease the viscosity to the desired point. In either of these cases the final viscosity is controlled by the concentration of the acid in the aqueous phase. Thus the present method may be used to recover polysiloxanes which have attained too high a viscosity to be practical for use.

Any monobasic acid is operative in this invention which has a dissociation constant of at least .01 at 25° C. Specific examples of such acids are iodic, perchloric, nitric, benzene sulphonic, trichloroacetic, dichloroacetic, trifluoroacetic, periodic, and hydrohalogen acids such as HCl, HBr and HI. In order that the reaction may proceed at an effective rate the amount of aqueous acid relative to the siloxane should be at least 10% by volume. When the amount of acid is below this amount, the rate of the reaction is so slow that no practical results are obtained. There is no critical upper limit to the amount of aqueous acid. The amount of water present in the acid should be sufficient to give a two-phase system. In other words, the amount of water should be sufficient to render the acid insoluble in the polysiloxane. Thus, the method of this invention is not carried out in a homogeneous system.

The advantages of this invention are not realized with dibasic and polybasic acids because of lack of control over the final product.

There is no lower limit to the concentration of the acid in the aqueous phase, although at very low concentrations the reaction rate becomes negligible. For practical purposes with most acids the concentration is above 15%.

It should be understood that one may simply add an acidic silane and water to the reaction zone. In this case both the siloxane and the acid will be generated "in situ." Thus employing an acidic silane and water is equivalent to starting with a siloxane and an aqueous acid and the former procedure is included within the scope of the claims of this invention. The relative amounts of silane and water employed should be such that the desired acid concentration will be produced in the aqueous phase. The acid silanes operative herein are those which upon hydrolysis will produce the siloxanes and monobasic acids above defined. Specific examples of such silanes are dihydrocarbonyl dichlorosilanes, dibromosilanes, bis-trifluoroacetoxy silanes and the like.

Inasmuch as the present process involves a two-phase reaction it is advantageous to employ adequate mixing of the two phases. This may be accomplished by rapid agitation of the system and by employing emulsifying agents. Too much emulsifying agent should not be used because it will interfere with subsequent washing of the product. The more intimately the two phases are mixed the faster will be the reaction.

Although the present reaction is best carried out in the absence of solvent, small amounts of solvents may be employed if desired. These solvents are water immiscible materials such as chloroform, toluene, ether and the like. They are particularly desirable when the starting material is a very high molecular weight siloxane and particularly so if the siloxane has gelled.

In order that the concentration of the ingredients should remain constant it is essential that the reaction of this invention be carried out in a closed system.

The products of the method of this invention are useful in adhesives, for treatment of fabrics to render them water repellent and to prevent spotting of the fabrics by grease, and as antifoaming compositions.

The following examples are illustrative only and should not be construed as limiting the invention which is properly delineated in the appended claims.

In all examples the percents given below are percents by weight unless otherwise specified.

*Example 1*

The change of the viscosity of the final product with the change in concentration of the aqueous acid is shown in the table below. In each case two parts by volume of octamethylcyclotetrasiloxane was agitated in a closed container with one part by volume of aqueous HCl having the concentrations shown below, at 25° C. until the viscosity of the siloxane became constant. In each case the aqueous layer was then removed and the siloxane layer was washed free of chlorine and devolatilized to give hydroxyl end-blocked dimethylpolysiloxanes having the viscosities shown below. In runs 1, 2, 6, and 8 the siloxane layer was first centrifuged to free it from any aqueous acid and the viscosity of the resulting chlorine end-blocked polysiloxane was determined as shown. These chlorine end-blocked polymers were then washed free of chlorine to give the corresponding hydroxyl end-blocked polysiloxanes.

| No. | Concentration of HCl | Viscosities of hydroxyl end-blocked siloxane in cs. at 25° C. | Viscosities of chlorine end-blocked polysiloxane in cs. at 25° C. |
|---|---|---|---|
| 1 | 40 | 208 | 285 |
| 2 | 38.4 | 670.6 | 587.5 |
| 3 | 37.9 | 745 | |
| 4 | 36.9 | 1,841 | |
| 5 | 36.75 | 2,909 | |
| 6 | 35.95 | 5,072 | 4,715 |
| 7 | 35.55 | 11,046 | |
| 8 | 34.91 | 13,255 | 11,891 |
| 9 | 34.1 | 42,515 | |
| 10 | 33.32 | 120,300 | |
| 11 | 32.3 | 400,000 | |
| 12 | 31.37 | 584,000 | |

*Example 2*

This example shows the precise viscosity control obtainable with the method of this invention and also the fact that the state of molecular aggregation of the starting siloxane is immaterial. In the table below the change in viscosity of siloxanes A and B is compared. Siloxane A was a dimethylpolysiloxane having a viscosity of 20 billion cs. as measured by the falling ball method. Siloxane B was the cyclic tetramer of dimethylpolysiloxane. Each of these siloxanes was placed in a closed container with an equal volume of 36.5% aqueous HCl and then agitated at 25° C. for the times shown. Periodically, as indicated in the table, samples were withdrawn from each siloxane and centrifuged to remove water and the viscosity of the centrifuged sample determined. These samples were chlorine end-blocked polydimethylsiloxanes.

| Time in hours | Viscosity in cs. of Siloxane A | Viscosity in cs. of Siloxane B |
|---|---|---|
| 0 | 20 billion | 2.3 |
| 22 | 115,020 | 30.27 |
| 29 | 43,200 | 58.09 |
| 48 | 16,653 | 1,139 |
| 52 | 14,888 | 1,202 |
| 70 | 11,799 | 1,755 |
| 76 | 9,936 | 1,755 |
| 97 | 7,789 | 2,069 |
| 122 | 6,399 | 2,295 |
| 141 | 5,508 | 2,646 |
| 148 | 4,549 | 1,920 |
| 165 | 3,750 | 2,457 |
| 171 | 3,078 | 1,930 |
| 189 | 3,132 | 2,902 |
| 196 | 2,970 | 2,673 |
| 213 | 3,368 | 2,740 |
| 309 | 3,469 | 3,267 |

*Example 3*

314 g. of diethyldichlorosilane and 36 g. of water were placed in a closed container and agitated for 2 weeks at 25° C. At this time the aqueous layer was removed and the siloxane layer was washed free of acid and devolatilized. The resulting fluid was a hydroxyl end-blocked diethylpolysiloxane fluid having a viscosity of 447 cs.

*Example 4*

429 g. of methylethyldichlorosilane and 54 g. of water were placed in a closed container and agitated for 30 days at 25° C. The aqueous layer was drawn off and found to have a concentration of 36.5% HCl. The siloxane layer was washed free of acid and devolatilized to give a hydroxyl end-blocked ethylmethylpolysiloxane fluid of 3,026 cs. viscosity.

*Example 5*

A viscosity increase was obtained when 200 g. of mixed cyclic phenylmethylsiloxanes were agitated in a closed container with 200 g. of 36.4% aqueous HCl for 24 days.

*Example 6*

A mixture of 387 g. of dimethyldichlorosilane and 1.7 g. of methylvinyldichlorosilane was agitated with 54.2 g. of water in a closed container at 25° C. for 10 days. At the end of this time the aqueous layer was removed and found to have an acid concentration of 35.5% HCl. The siloxane layer was washed free of acid and there was obtained a 12,600 cs. fluid which was a hydroxyl end-blocked copolymer of dimethylsiloxane and methylvinylsiloxane.

*Example 7*

A mixture of 278.1 g. of mixed cyclic phenylmethylsiloxanes and 1847.7 g. of the cyclic tetramer of dimethylsiloxane was agitated in a closed container at 25° C. with 1,000 ml. of 36.5% aqueous HCl. At the end of 8 days the aqueous layer was separated and the siloxane layer was washed free of acid and devolatilized to give a dimethylsiloxane-phenylmethylsiloxane copolymeric fluid having hydroxyl end blocks. This fluid had a viscosity of 1,859 cs.

*Example 8*

Equal volumes of the cyclic tetramer of dimethylsiloxane and 44.3% aqueous hydrobromic acid were placed in a closed container and agitated at 25° C. for 9 days. The siloxane layer was centrifuged to remove the remaining aqueous acid, whereupon there was obtained a bromine end-blocked dimethylpolysiloxane fluid having a viscosity of 56,500 cs.

*Example 9*

Equal volumes of the cyclic tetramer of dimethylsiloxane and 58% aqueous hydriodic acid were agitated intermittently at 25° C. until a viscosity of 500,000 cs. was obtained.

*Example 10*

A mixture of 1,000 ml. of mixed cyclics of dimethylsiloxane and 250 ml. of 67.76% aqueous nitric acid was agitated in a closed container at 25° C. for 5 days. At the end of this time the aqueous layer was separated and the siloxane layer was washed free of acid to give a hydroxyl end-blocked dimethylpolysiloxane having a viscosity of 20,000 cs.

*Example 11*

500 ml. of mixed cyclic dimethylsiloxanes were mixed with 209.9 g. of trifluoroacetic acid and 68.3 g. of water, giving an aqueous acid concentration of 75.3%. The mixture was agitated in a closed container at 25° C. for 20 days. The aqueous layer was removed and the siloxane was washed free of acid to give a hydroxyl end-blocked dimethylpolysiloxane fluid of 2033 cs. viscosity.

*Example 12*

Equivalent results were obtained when trichloroacetic acid was employed in place of trifluoroacetic acid in the method of Example 11.

*Example 13*

1,000 ml. of mixed cyclic dimethylsiloxanes, 1,000 ml. of 36.5% aqueous HCl and 4.75 g. of the emulsifying agent octadecyltrimethyl ammonium chloride were agitated in a closed container at 25° C. During the agitation, 205 ml. of additional water was added portionwise. The agitation was continued until a constant viscosity was obtained. The aqueous layer was removed and the siloxane layer washed free of acid and devolatilized to give a fluid dimethylpolysiloxane having a viscosity of 2,480,000 cs.

*Example 14*

64.5 g. of the cyclic tetramer of dimethylsiloxane and 29.9 g. of concentrated aqueous HCl were placed in a closed container and gaseous HCl was added under pressure so that the concentration of acid in the aqueous phase was about 43%. The mixture was then agitated under pressure at 25° C. for 7 days. After separation of the aqueous layer, the siloxane layer was subjected to vacuum to remove water and there was obtained a chlorine end-blocked polysiloxane fluid of 28 cs. When this material was washed free of chlorine, the resulting hydroxyl end-blocked polysiloxane fluid had a viscosity of 62 cs.

*Example 15*

The starting siloxane in this example was a 21 cs. copolymer of 99.95 mol percent dimethylsiloxane and .05 mol percent monomethylsiloxane which was obtained by the commercial hydrolysis of a mixture of dimethyldichlorosilane and monomethyltrichlorosilane. 1300 ml. of this siloxane and 400 ml. of 36.5% aqueous HCl were agitated in a closed container at 25° C. During the agitation 6 ml. of additional water were added. The agitation was continued for 15 days. At the end of this time the aqueous layer was removed and the siloxane layer washed free of acid to give a hydroxyl end-blocked polysiloxane fluid having a viscosity of 17,370 cs. A titration of the aqueous layer showed that the final concentration of HCl was 35.3%.

*Example 16*

When chlorophenylmethylsiloxane of 100 cs. viscosity is reacted with 36.5% aqueous HCl in the manner of Example 15 a chlorine end-blocked polymer is obtained. When this is washed with water until it is free of chlorine the corresponding hydroxyl end-blocked polymer is obtained.

That which is claimed is:

1. A method of preparing siloxanes of controlled viscosity which comprises maintaining in contact with each other an organopolysiloxane having the unit formula $$R_nSiO_{\frac{4-n}{2}}$$

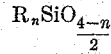

where R is selected from the group consisting of monovalent hydrocarbon radicals and halogenated monovalent radicals and n has an average value from 1.98 to 2 and a separate aqueous phase comprising an aqueous solution of a monobasic acid having a dissociation constant of at least .01 at 25° C., said aqueous phase being present in amount of at least 10% by volume of the siloxane, in a closed system at a temperature below that at which the organic groups are cleaved from the silicon until the viscosity of the siloxane has become essentially constant.

2. A method of preparing hydroxyl end-blocked polysiloxanes which comprises maintaining in contact with each other a siloxane having the unit formula $$R_nSiO_{\frac{4-n}{2}}$$

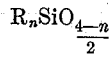

where R is selected from the group consisting of monovalent hydrocarbon radicals and halogenated monovalent hydrocarbon radicals and n has an average value from 1.98 to 2 and a separate aqueous phase comprising an aqueous solution of a monobasic acid having a dissociation constant of at least .01 at 25° C., said aqueous phase being present in amount of at least 10% by volume of the siloxane in a closed system at a temperature below that at which the organic groups are cleaved from the silicon until the viscosity of the siloxane has become essentially constant and thereafter separating the siloxane from the acid phase and washing the siloxane free of acid groups.

3. A method in accordance with claim 1 wherein the siloxane is a methylsiloxane.

4. A method in accordance with claim 1 wherein the siloxane is a methylphenylsiloxane.

5. A method in accordance with claim 2 wherein the siloxane is a methylsiloxane.

6. A method in accordance with claim 2 wherein the siloxane is a methylphenylsiloxane.

7. A linear organopolysiloxane having a viscosity of at least 100 cs. in which siloxane the silicon atoms are connected through oxygen atoms, the silicon atoms have connected thereto through SiC bonds on the average from 1.98 to 2 organic radicals selected from the group consisting of monovalent hydrocarbon radicals and halogenated monovalent hydrocarbon radicals, per silicon atom and the terminal silicon atoms have an acid group attached thereto which is the anion of a monobasic acid having a dissociation constant of at least .01 at 25° C.

8. A siloxane in accordance with claim 7 wherein the organic radicals are methyl radicals.

References Cited in the file of this patent

UNITED STATES PATENTS

| | | |
|---|---|---|
| 2,382,082 | McGregor et al. | Aug. 14, 1945 |
| 2,416,503 | Trautman et al. | Feb. 25, 1947 |